(12) United States Patent
Liao et al.

(10) Patent No.: US 8,736,110 B2
(45) Date of Patent: May 27, 2014

(54) SIMPLIFIED MULTILEVEL DC CONVERTER CIRCUIT STRUCTURE

(75) Inventors: Yi-Hung Liao, Erlun Township (TW); Ching-Ming Lai, Taichung (TW)

(73) Assignee: National Penghu University of Science and Technology, Magong (TW)

( * ) Notice: Subject to any disclaimer, the term of this patent is extended or adjusted under 35 U.S.C. 154(b) by 492 days.

(21) Appl. No.: 13/180,183

(22) Filed: Jul. 11, 2011

(65) Prior Publication Data

US 2013/0016547 A1    Jan. 17, 2013

(51) Int. Cl.
*H02J 3/30* (2006.01)

(52) U.S. Cl.
USPC ............................................................ 307/71

(58) Field of Classification Search
USPC ............................................................ 307/71
See application file for complete search history.

(56) References Cited

U.S. PATENT DOCUMENTS

2005/0068010 A1 * 3/2005 Chen et al. ..................... 323/210

* cited by examiner

*Primary Examiner* — Robert L. Deberadinis
(74) *Attorney, Agent, or Firm* — Wang Law Firm, Inc.; Li K. Wang; Stephen Hsu (57) ABSTRACT

A simplified multilevel DC converter circuit structure comprises a dual input DC power supply, a power control module and an AC side low-pass filter, wherein each of the dual input DC power supply supplies half of the rated DC voltage to the power control module, and the power control module is composed of six power switches, and different switching combinations of each power switch are controlled to convert a DC voltage to an output of an AC voltage, and two of the power switches of the power control module perform a low-frequency switching twice every cycle of the output voltage, and the withstand voltage is equal to the input voltage, and the remaining power switches perform the switching by a high frequency, and the withstand voltage is only half of the input voltage, such that a multilevel voltage can be outputted, and a low harmonic AC waveform can be outputted from the AC side low-pass filter.

6 Claims, 11 Drawing Sheets

SIMPLIFIED MULTILEVEL DC CONVERTER CIRCUIT STRUCTURE

BACKGROUND OF THE INVENTION (a) Field of the Invention

The present invention relates to a DC converter circuit, in particular to a simplified multilevel DC converter circuit structure comprising six power switches.

(b) Description of the Related Art

Figure 15:
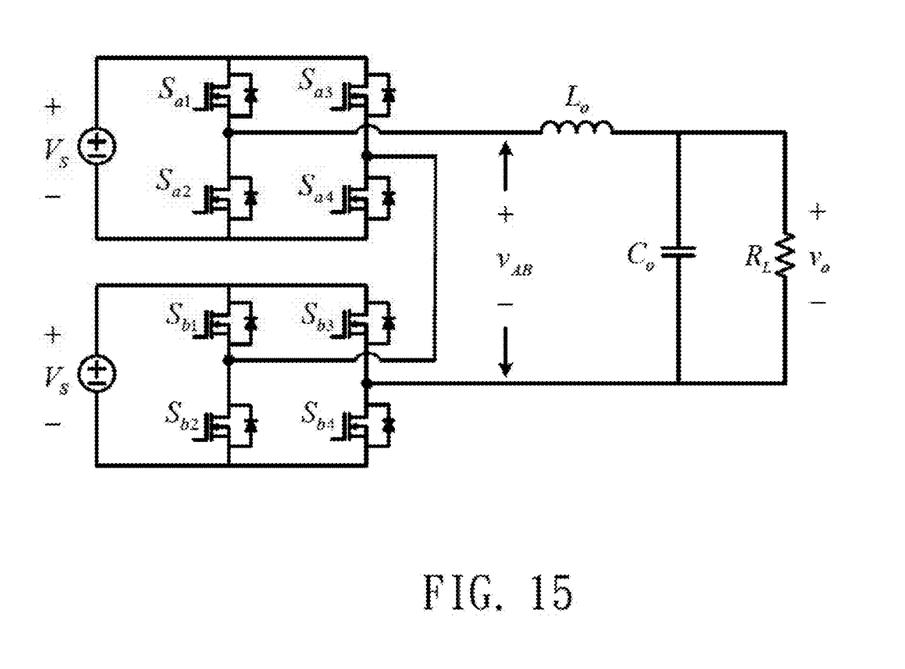
FIG. 15 is schematic circuit diagram of a conventional DC converter circuit.

With reference to FIG. 15 for a conventional DC converter circuit, the DC converter circuit includes eight power switches Sa1, Sa2, Sa3, Sa4, Sb1, Sb2, Sb3, Sb4, wherein different switching combinations of the power switches are controlled to achieve the effect of converting a DC voltage to an AC voltage for the output.

However, the foregoing conventional DC converter circuit adopts eight power switches Sa1, Sa2, Sa3, Sa4, Sb1, Sb2, Sb3, Sb4, not only involving too many components, but also failing to lower the component cost effectively, since every power switch has to bear a withstand voltage equal to the supply voltage. Furthermore, all power switches perform the switching operation at a high frequency when the conventional DC converter circuit converts direct currents, and thus incurring a higher switching loss and an easier damage to the power switches.

SUMMARY OF THE INVENTION

Therefore, it is a primary objective of the present invention to overcome the aforementioned problem by providing a simplified multilevel DC converter circuit structure applied high-quality single-phase or three-phase AC electric applications such as the applications of driving a motor, an alternative energy generation system, an uninterruptible power supply, and an audio amplifier. These applications simply require a use of six power switches only, and thus the component cost can be reduced effectively. In addition, two of the power switches perform the switching operation at a low frequency (60 Hz), and thus the loss for switching the low-power switches ON or OFF can be reduced to improve the overall efficiency of converting DC voltage to AC voltage.

Another objective of the present invention is to provide a simplified multilevel DC converter circuit structure, wherein each of the dual input DC power supplies supplies half of the rated DC voltage to a power control module to reduce the voltage and current stresses of the low-power switches effectively, and the power switches with a lower withstand voltage are used to achieve the effect of lowering the cost.

Another objective of the present invention is to provide a simplified multilevel DC converter circuit structure, wherein a multilevel synthesis control method and a harmonic distortion capable of reducing output waveforms are adopted to achieve a high-quality output, and the modular characteristic of the structure can further improve the power density and reliability of the converter.

To achieve the foregoing objectives, the invention provides a simplified multilevel DC converter circuit structure, comprising a dual input DC power supply, a power control module and an AC side low-pass filter, wherein each of the dual input DC power supplies supplies half of the rated DC voltage to the power control module, and the power control module is composed of six power switches, and different switching combinations of the power switches are controlled for converting DC voltage to AC voltage for the output, and two power switches of the power control module perform a low-frequency switching twice for every cycle of the output voltage, and the remaining power switches perform the switching at a high frequency to synthesize an output of a multilevel voltage. The AC side low-pass filter can output a low harmonic AC waveform. In the conversion process, the power inputted from the dual input DC power supply passes through at most three power switches only.

DETAILED DESCRIPTION OF THE PREFERRED EMBODIMENTS

Figure 1:
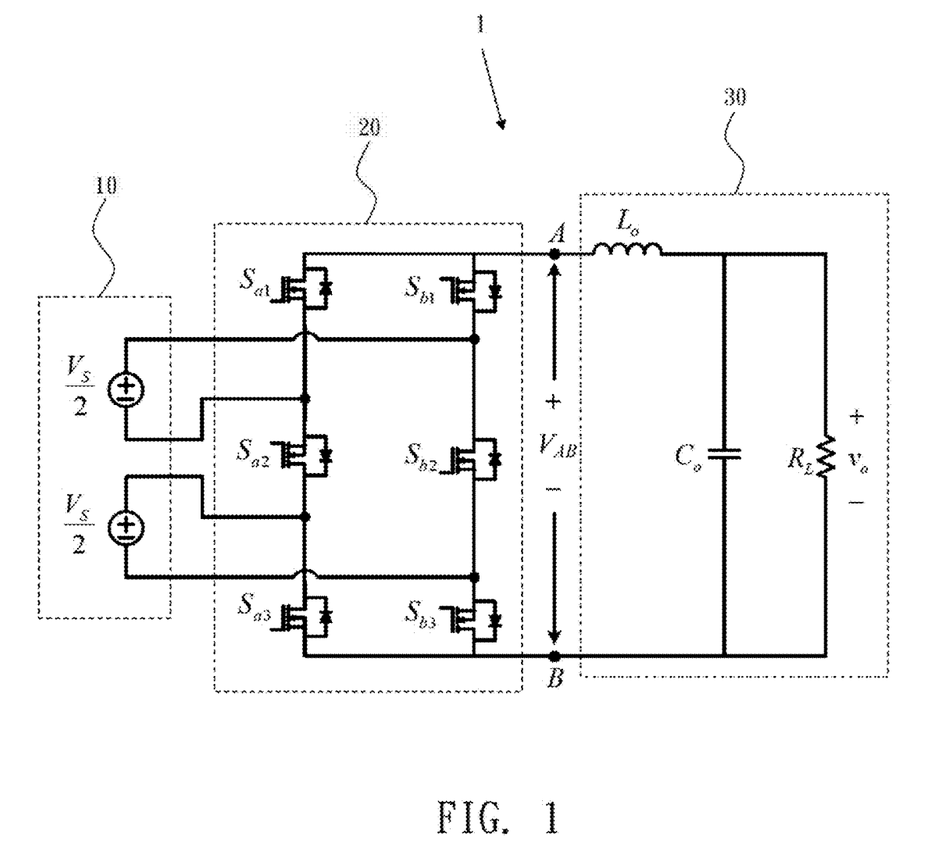
FIG. 1 is a schematic circuit diagram of the present invention.

With reference to FIG. 1 for a schematic circuit diagram of a simplified multilevel DC converter circuit structure 1 of the present invention, the simplified multilevel DC converter circuit structure 1 comprises a dual input DC power supply 10, a power control module 20 and an AC side low-pass filter 30, wherein each of the dual input DC power supply 10 supplies half of the rated DC voltage to the power control module 20, and the power control module 20 is composed of six power switches Sa1, Sa2, Sa3, Sb1, Sb2, Sb3, and different switching combinations of the power switches Sa1, Sa2, Sa3, Sb1, Sb2, Sb3 can be controlled to convert an input of DC voltage into an output of AC voltage, and two of the power switches Sa2, Sb2 among the power control module 20 perform a low-frequency switching twice every cycle (60 Hz) of the output voltage, and the remaining power switches Sa1, Sa3, Sb1, Sb3 perform the switching at a high frequency, and the AC side low-pass filter 30 synthesizes the voltage VAB at an AB terminal to produce an output of a multilevel voltage by controlling different switching combinations of the power switches Sa1, Sa2, Sa3, Sb1, Sb2, Sb3 to achieve the effect of outputting a low harmonic high-quality AC waveform.

Each of the dual input DC power supply 10 supplies half of the rated DC voltage to the power control module 20, such that the withstand voltage of the power switch Sa2, Sb2 is equal to the input voltage VS, and the remaining power switches Sa1, Sa3, Sb1, Sb3 have a withstand voltage equal to half of the input voltage VS, such that the voltage and current stresses of the low-power switches can be reduced effectively, and a lower withstand voltage of the power switches can be used to achieve the effect of reducing the component cost.

Excluding the inoperable working status, the power control module 20 of the present invention has a total of eight Switching combinations available for its use as listed below.

| Switching Combination | Sa1 | Sa2 | Sa3 | Sb1 | Sb2 | Sb3 | VAB |
|---|---|---|---|---|---|---|---|
| 1 | 1 | 1 | 1 | 0 | 0 | 0 | 0 |
| 2 | 0 | 1 | 1 | 1 | 0 | 0 | VS/2 |
| 3 | 0 | 1 | 0 | 1 | 0 | 1 | VS |
| 4 | 1 | 1 | 0 | 0 | 0 | 1 | VS/2 |
| 5 | 0 | 0 | 0 | 1 | 1 | 1 | 0 |
| 6 | 1 | 0 | 0 | 0 | 1 | 1 | −VS/2 |
| 7 | 1 | 0 | 1 | 0 | 1 | 0 | −VS |
| 8 | 0 | 0 | 1 | 1 | 1 | 0 | −VS/2 |

In the DC conversion process, the power control module 20 controls the power inputted from the dual input DC power supply 10 to pass through at most three power switches only.

The circuit combinations defined by the aforementioned eight Switching combinations are shown in FIGS. 2 to 9 respectively.

Figure 2:
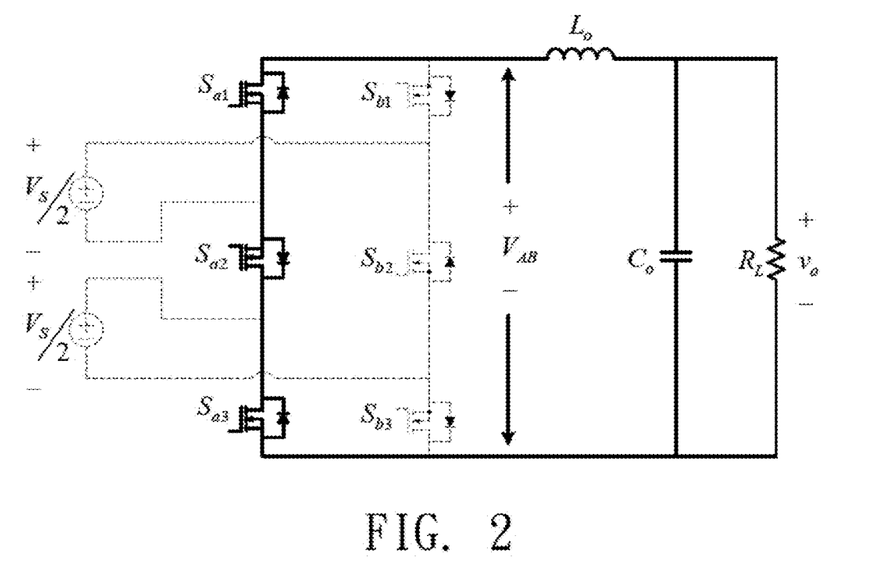
FIG. 2 is a schematic circuit diagram of the present invention at the switching combination 1.

With reference to FIG. 2 for a schematic circuit diagram of the switching combination 1, the switches Sa1, Sa2, Sa3 are ON, such that the output voltage VAB at the AB terminal is equal to zero, and the inductive current is at a discharge state.

Figure 3:
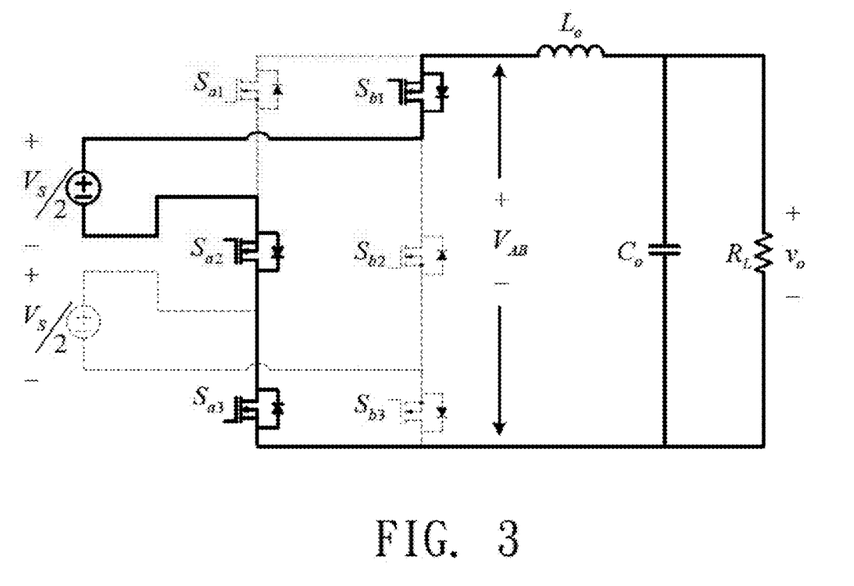
FIG. 3 is a schematic circuit diagram of the present invention at the switching combination 2.

With reference to FIG. 3 for a schematic circuit diagram of the switching combination 2, the switches Sa2, Sa3, Sb1 are ON, such that the AB terminal provides a positive output voltage VAB equal to VS/2.

Figure 4:
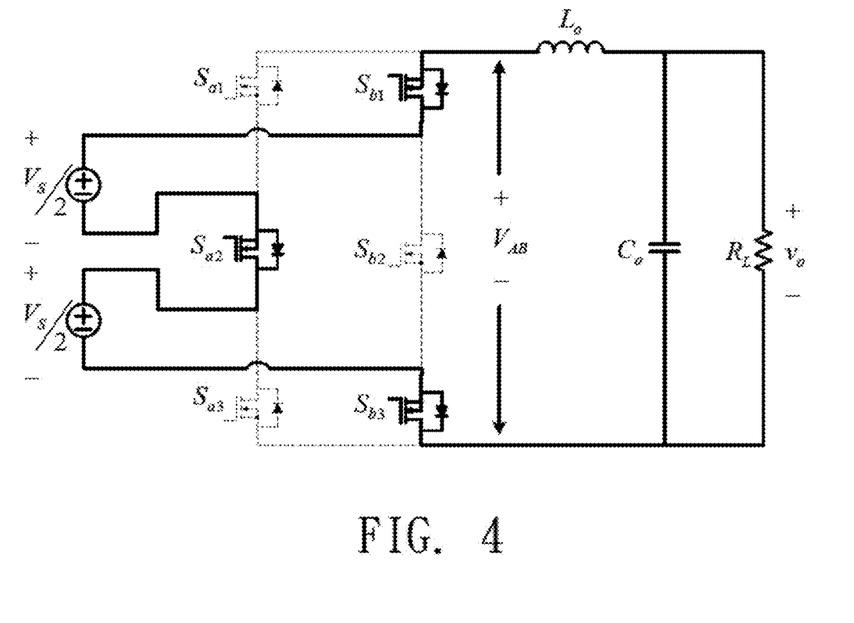
FIG. 4 is a schematic circuit diagram of the present invention at the switching combination 3.

With reference to FIG. 4 for a schematic circuit diagram of the switching combination 3 the switches Sa2, Sb1, Sb3 are ON, such that the AB terminal provides a positive output voltage VAB equal to VS.

Figure 5:
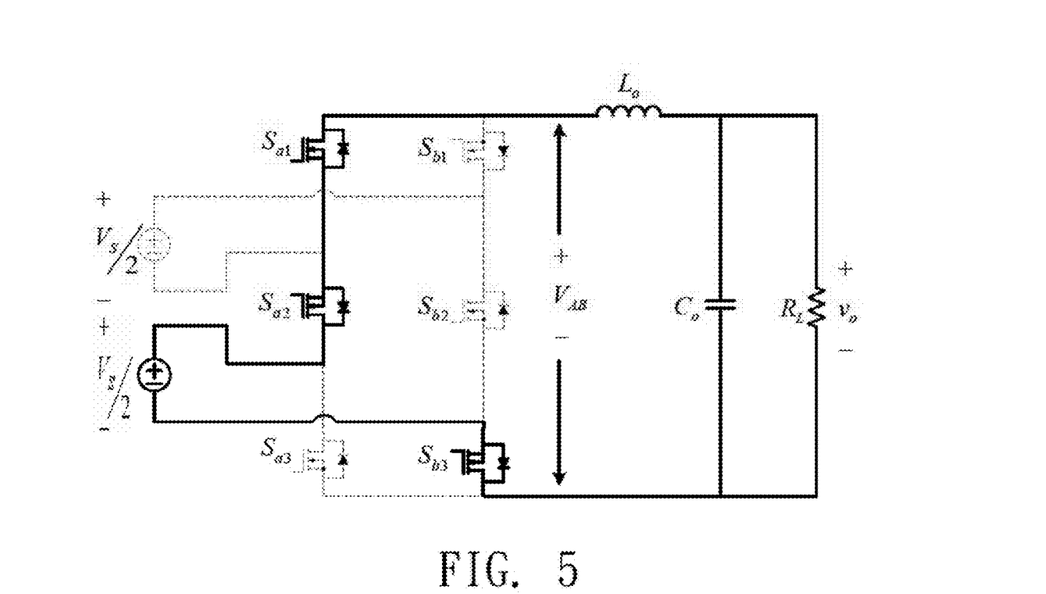
FIG. 5 is a schematic circuit diagram of the present invention at the switching combination 4.

With reference to FIG. 5 for a schematic circuit diagram of the switching combination 4, the switches Sa1, Sa2, Sb3 are ON, such that the AB terminal provides a positive output voltage VAB equal to VS/2.

Figure 6:
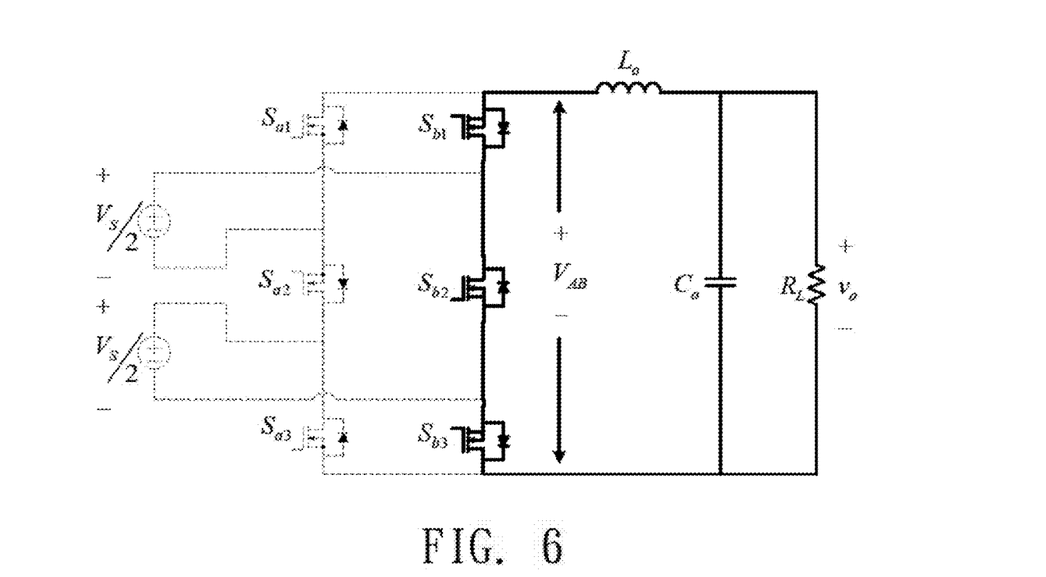
FIG. 6 is a schematic circuit diagram of the present invention at the switching combination 5.

With reference to FIG. 6 for a schematic circuit diagram of the switching combination 5, the switches Sb1, Sb2, Sb3 are ON, such that the output voltage VAB at the AB terminal is equal to zero, and the inductive current is at a discharge state.

Figure 7:
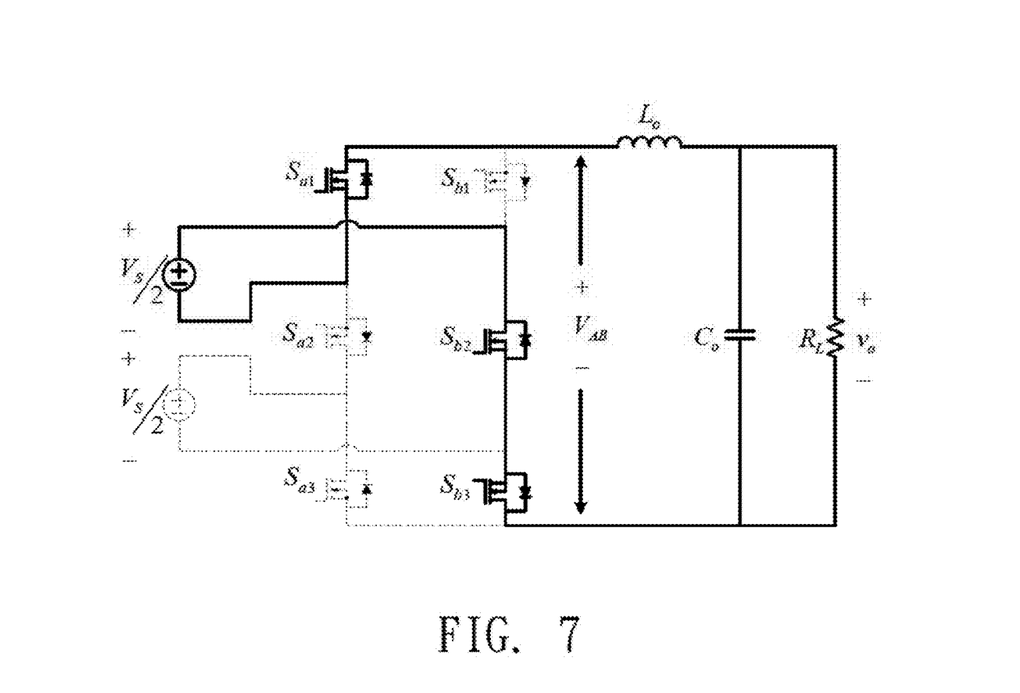
FIG. 7 is a schematic circuit diagram of the present invention at the switching combination 6.

With reference to FIG. 7 for a schematic circuit diagram of the switching combination 6, the switches Sa1, Sb2, Sb3 are ON, such that the AB terminal provides a negative output voltage VAB equal to −VS/2.

Figure 8:
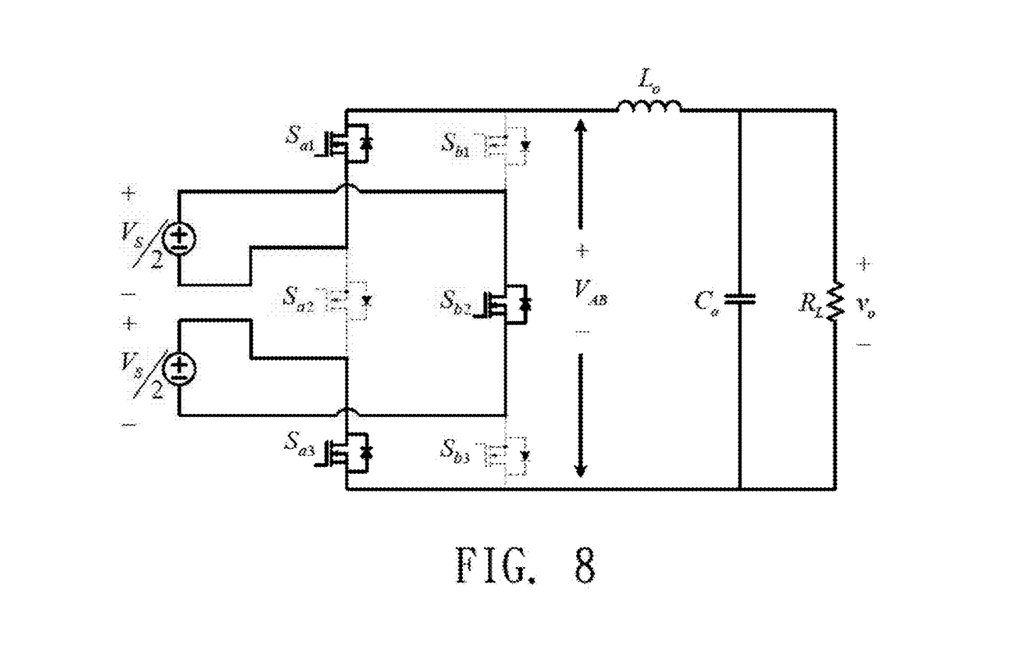
FIG. 8 is a schematic circuit diagram of the present invention at the switching combination 7.

With reference to FIG. 8 for a schematic circuit diagram of the switching combination 7, the switches Sa1, Sa3, Sb2 are ON, such that the AB terminal provides a negative output voltage VAB equal to −VS.

Figure 9:
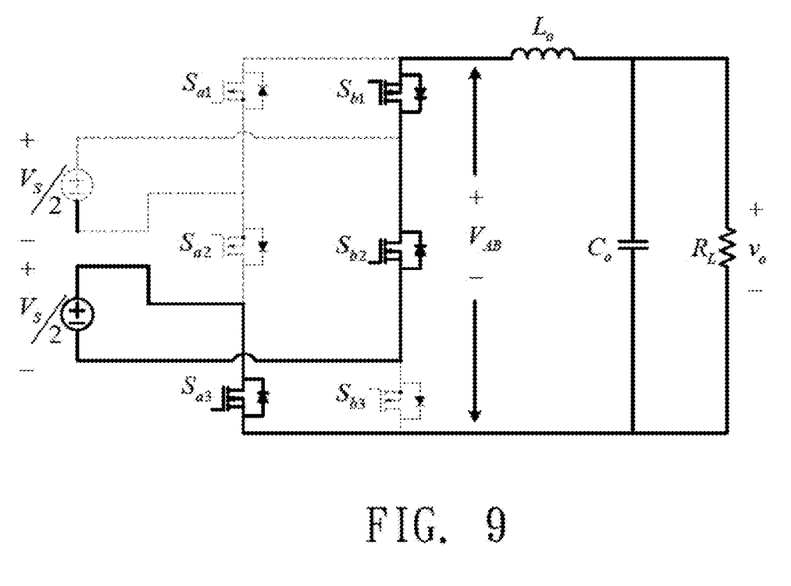
FIG. 9 is a schematic circuit diagram of the present invention at the switching combination 8.

With reference to FIG. 9 for a schematic circuit diagram of the switching combination 8, the switches Sa3, Sb1, Sb2 are ON, such that the AB terminal provides a negative output voltage VAB equal to −VS/2.

Figure 12:
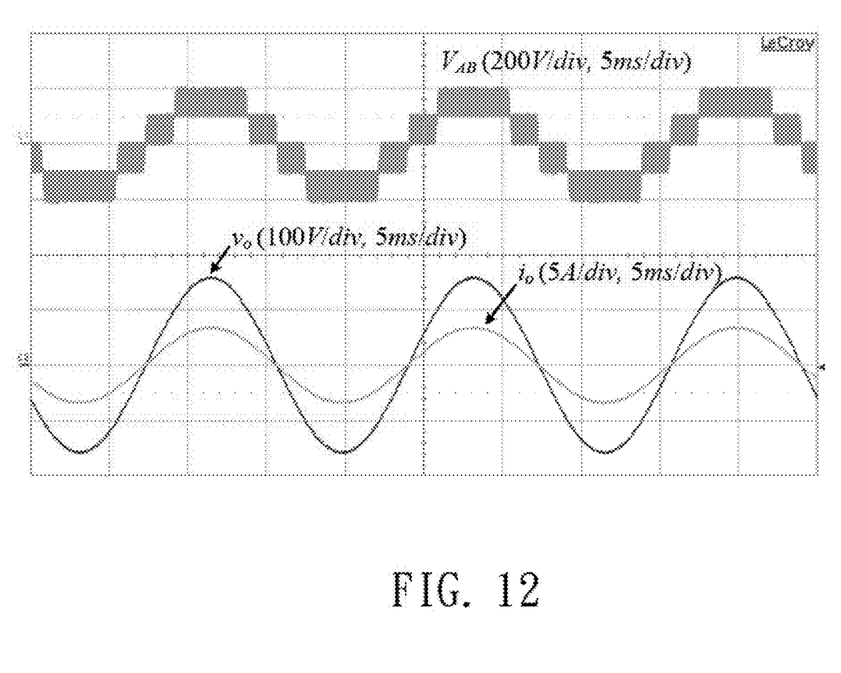
FIG. 12 shows an output waveform of the present invention.

The switching combination can be switched to synthesize an output of AC waveform with different levels of voltages (as shown in FIG. 12).

Figure 10:
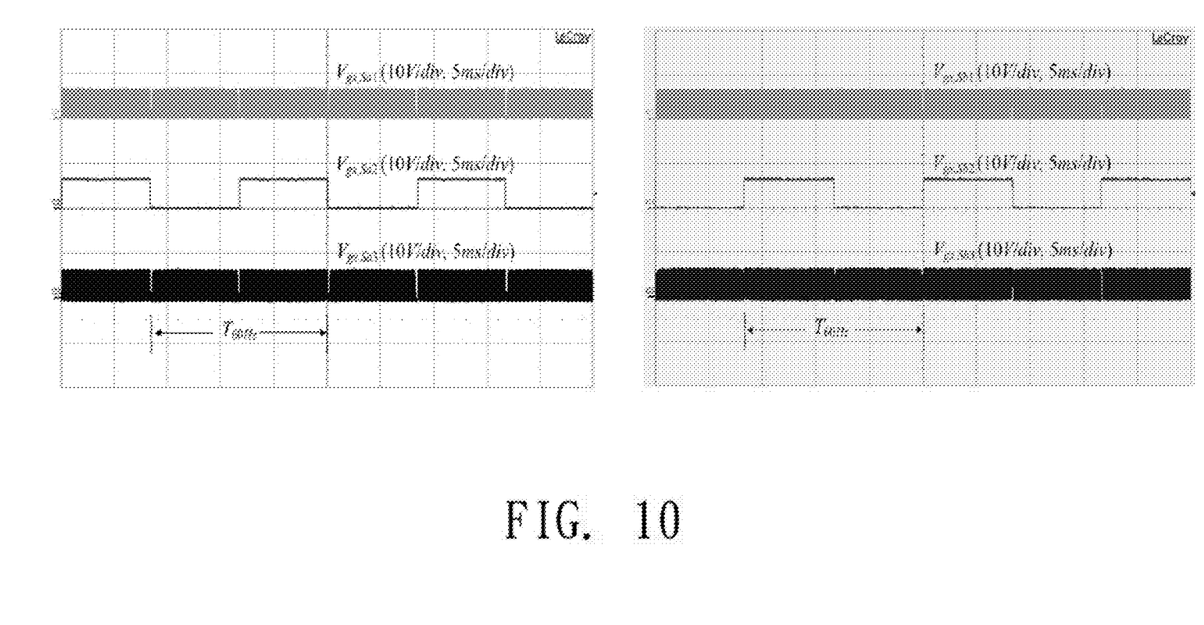
FIG. 10 shows a switch driving waveform of the present invention.

The circuit structures of the present invention are tested with the following conditions:
 Rated output power: Po=200 W
 Input voltage: Vs=200V
 Output voltage: Vo=110 VRMS
 Line frequency: fo=60 Hz
 Switching frequency: fs=40 kHz
 Output filter inductor: Lo=1 mH
 Output filter capacitor: Co=4.7 uF With reference to FIG. 10 for a switch driving waveform of the present invention, the circuit structure and the measured results obtained by the aforementioned data are provided, and the switches Sa2 and Sb2 among the six power switches perform the switching twice for every cycle (60 Hz) of the output voltage, so as to achieve the effect of reducing the switching loss of the low-power switch in a cycle (60 Hz), and the remaining four switches Sa1, Sa3, Sb1, Sb3 perform the switching at a high frequency.

Figure 11:
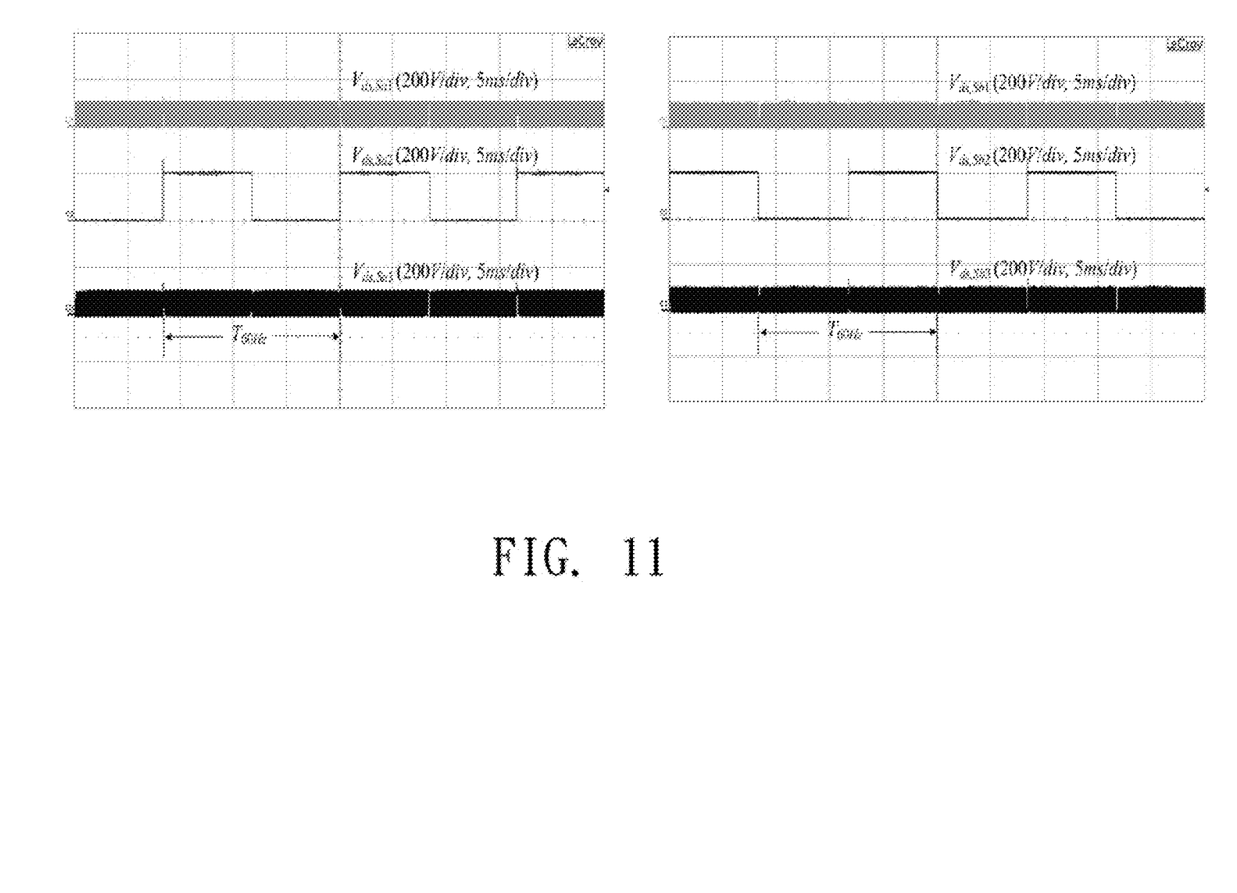
FIG. 11 shows a switch cross-voltage waveform of the present invention.

With reference to FIG. 11 for a switch cross-voltage waveform, if both inputted DC voltages Vdc equal 100V, the maximum cross-voltage of the power switches Sa1, Sa3, Sb1 and Sb3 equals to 100V, and the cross-voltage of the remaining two power switches Sa2 and Sb2 equals to 200V. The output waveform as shown in FIG. 12 indicates that the AB terminal voltage of the circuit structure of the present invention is a five-level voltage, and the output voltage equals to 110 Vrms, and the total harmonic wave of the output voltage can be less than 3%.

Figure 13:
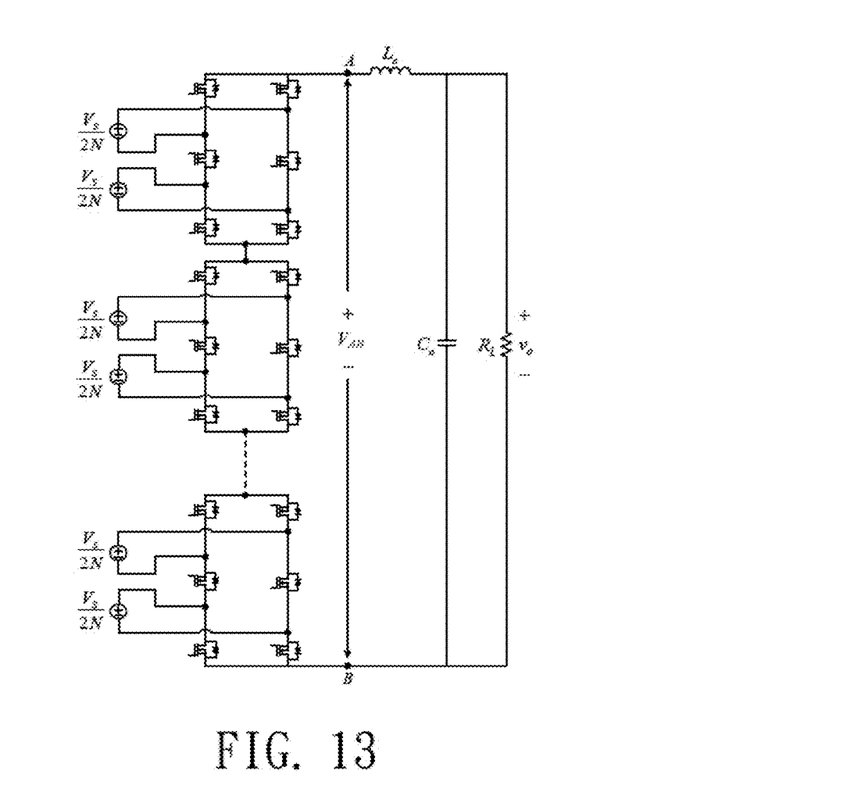
FIG. 13 is a schematic circuit diagram of another preferred embodiment of the present invention.

It is noteworthy to point out that the foregoing embodiment of the circuit structure is used for illustrating the present invention, but persons ordinarily skilled in the art should understand that the present invention is not limited to such embodiment only. With reference to FIG. 13 for a schematic circuit diagram of another preferred embodiment of the present invention, a plurality of modular simplified multilevel DC converter circuit structures 1 can be connected in series with each other to achieve an output with more-level voltages, and the simplified multilevel DC converter circuit structure 1 of the present invention can be used as a base to expand to a (4n+1) level output voltage, wherein n is the total number (or a positive integer) of the serially connected circuit structures.

The serially connected simplified multilevel DC converter circuit structures 1 of the present invention not only provide an output voltage of more levels to increase the output voltage, but also integrate a plurality small voltages into a large voltage for the output, so as to achieve the effect of extending the life of each power component in the circuit structure 1 of the present invention.

Figure 14:
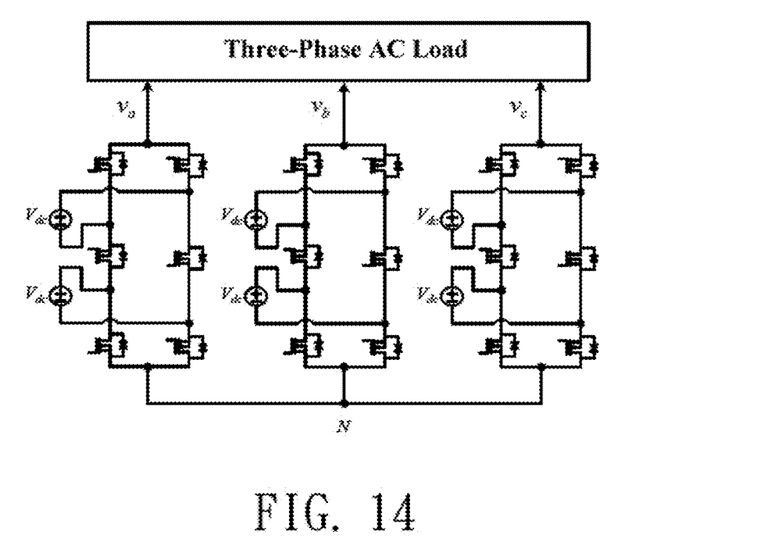
FIG. 14 is a schematic circuit diagram of the present invention applied to a three-phase Y-connected circuit.

In addition to the foregoing application of the present invention, three modular simplified multilevel DC converter circuits can be connected in parallel with each other as shown in 14 and applied in a three-phase Y-connected circuit. Similarly, the same arrangement can be applied to a three-phase Δ-connected circuit. In addition, the circuit structure of the present invention has a bi-directional flow capability, so that it can be applied to renewable energy grid-connected systems and direct battery charging systems by utility electricity.

In summation of the description above, the simplified multilevel DC converter circuit structure of the present invention simply uses six power switches (less than the number used in the prior art), wherein two of the six power switches (Sa2 and Sb2) perform the switching at a low frequency (60 Hz), and the switching loss of each power switch can be reduced effectively, and the voltage and current stresses of each power switch Sa1, Sa2, Sa3, Sb1, Sb2, Sb3 can be minimized.

In addition, the circuit structure of the present invention adopts a multilevel synthesis adjustment control to reduce the harmonic distortion of the output waveform to achieve a high-quality output, and also uses the modular characteristic to improve the power density and reliability of the converter. In the energy conversion process operated by the converter, the power passes through at most three power switches only, so as to lower the conducting loss.

With the circuit structure of the present invention, the number of power switches can be decreased to lower the component cost, and the overall efficiency of converting DC voltage to AC voltage can be improved.

What is claimed is:

1. A simplified multilevel DC converter circuit structure, comprising a dual input DC power supply, a power control module and an AC side low-pass filter, wherein each of the dual input DC power supply supplies half of a rated DC voltage to the power control module, and the power control module is composed of six power switches, and different switching combinations of the power switches are controlled to convert an input of DC voltage into an output of AC voltage, and two power switches of the power control module perform a switching at a low frequency twice for every cycle of the output voltage, and the remaining power switches perform a switching at a high frequency to synthesize an output of a multilevel voltage, and the AC side low-pass filter can output a low harmonic AC waveform, and during the DC conversion process, the power inputted from the dual input DC power supply passes at most three power switches.

2. The simplified multilevel DC converter circuit structure of claim 1, wherein the output voltage has a cycle equal to 60 Hz.

3. The simplified multilevel DC converter circuit structure of claim 1, wherein the power control module has eight Switching combinations that can be synthesized into a five-level voltage.

4. The simplified multilevel DC converter circuit structure of claim 1, wherein a plurality of modular simplified multilevel DC converter circuit structures can be connected in series with each other to achieve an output of a multilevel voltage and constitute a (4n+1) level output voltage provided that n is the total number of the serially connected circuit structures.

5. The simplified multilevel DC converter circuit structure of claim 1, wherein three modular simplified multilevel DC converter circuit structures can be connected in parallel with each other and applied to a three-phase Y-connected circuit.

6. The simplified multilevel DC converter circuit structure of claim 1, wherein three modular simplified multilevel DC converter circuit structures can be connected in parallel with each other and applied to a three-phase Δ-connected circuit.

* * * * *